June 4, 1963 R. E. MILFORD 3,092,732
MAXIMUM SIGNAL IDENTIFYING CIRCUIT
Filed May 1, 1959
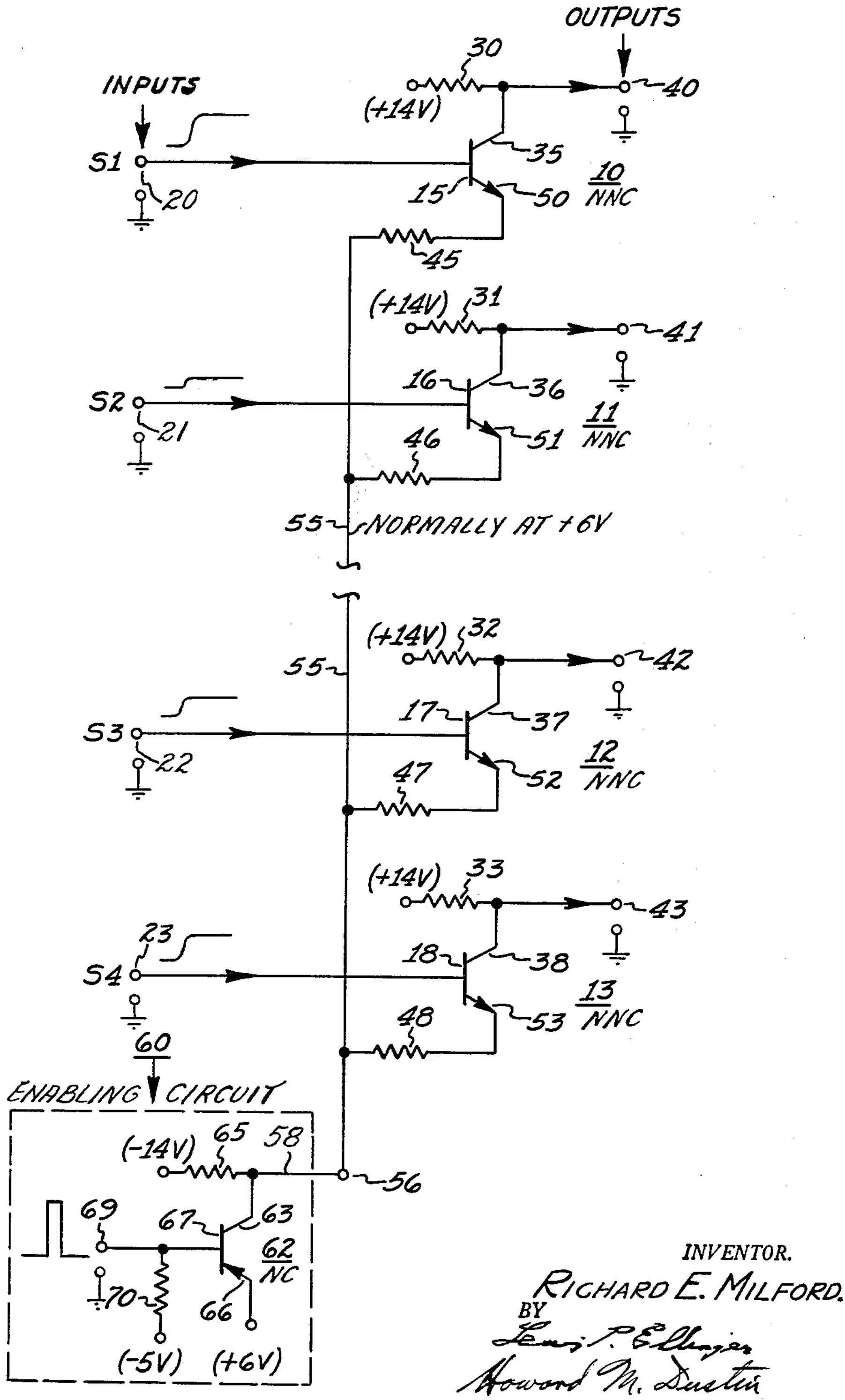
INVENTOR.
RICHARD E. MILFORD.
BY
Louis P. Ellinger
Howard M. Dustin United States Patent Office
3,092,732
Patented June 4, 1963

3,092,732

MAXIMUM SIGNAL IDENTIFYING CIRCUIT

Richard E. Milford, Glendale, Ariz., assignor to General Electric Company, a corporation of New York Filed May 1, 1959, Ser. No. 810,485
8 Claims. (Cl. 307—88.5)

This invention relates to circuits for identifying a particular one of a group of electrical signals and more particularly to a circuit for identifying the one of a plurality of input signals that has the greatest voltage amplitude.

Certain types of apparatus provide information in the form of a plurality of output signals delivered at respective ones of a plurality of output terminals and each of these terminals corresponds to a given elemental part of input data received by the apparatus. The elemental parts of the data received will be referred to throughout this specification as "data elements" which are electrical representations of intelligence or data and may be in the form of digital codes or signals of different amplitudes, waveshapes or other configurations. These electrical representations are distinguished from each other to enable identification of the character of the intelligence represented by the corresponding data element. Upon analysis of the input data received, the apparatus delivers signals at one or more of the output terminals and the apparatus is so arranged that the output terminal which corresponds to the element of data received delivers a signal having an amplitude greater than the signals delivered by all the other output terminals. An example of apparatus of this type is disclosed in a United States patent application by P. E. Merritt and C. M. Steele, filed December 29, 1958, Serial No. 783,350 for Spurious Signal Suppression in Automatic Symbol Reader, which is assigned to the common assignee of the present invention. The automatic symbol reader described in that application is adapted to identify any one of a plurality of different symbols. A waveshape derived from a symbol is applied to a plurality of different correlation networks, each of which corresponds to a different symbol. Signals are delivered at the output terminals of all correlation networks whenever a waveshape is applied to them and the network corresponding to the symbol from which the waveshape was derived is the one which delivers the output signal having the greatest amplitude.

Apparatus of the type described above may be coupled to data processing equipment and, if such be the case, a representation which is usable in data processors must be provided to identify the data elements received; therefore, an identification signal is provided by the present invention to represent the one of the plurality of output terminals which delivers the greatest amplitude signal.

It is therefore a principal object of the present invention to automatically identify a particular one of a group of signals.

Another object of this invention is to automatically identify that one of a plurality of signals which has an extreme value.

Another object is to automatically identify that one of a plurality of signals which has the greatest value of voltage amplitude.

Another object of this invention is to provide apparatus for delivering a signal at an output terminal which corresponds to the one of a plurality of input signals having the greatest amplitude.

The input signals received frequently fluctuate, with time, as the original intelligence data element is received. Most reliable identification of the data element can usually be made only at a given moment, especially when a plurality of data elements are received sequentially. The symbol reader described in the aforementioned application receives the waveshapes in rapid succession and each waveshape must be identified as that which represents a corresponding symbol.

Therefore, it is another object of the invention to automatically identify, at a predetermined moment, the one of a plurality of signals which has an extreme value.

Identification apparatus of the type referred to above occasionally receives a false representation of intelligence by the data element, such as when the symbol has been poorly printed or multilated or when the symbol read is not one for which the correlation network was designed to recognize. In such case, the maximum amplitude signal that would erroneously appear at one of the output terminals would falsely identify the data element as another data element and, in each instance, the signal would provide a false identification of the symbol represented by the data element.

Erroneous output signals caused by the receipt of a false data element may be detected by sensing the ratio between the amplitudes of the greatest and the next-greatest output signals, and by generating an error indication signal when these two amplitudes are not sufficiently distinct. Under such conditions, the ratio between the greatest and the next-greatest output signal resulting from a truly representative data element must not be less than a predetermined value; whereas, this ratio is usually less than such predetermined value when a false data element is received.

It is therefore another object of this invention to automatically identify the one of a plurality of signals which exceeds all others in value by not less than a predetermined ratio.

Still another object of this invention is to identify the one of a plurality of signals which has the greatest amplitude, but to indicate an error when the ratio between this greatest amplitude signal and the next-greatest amplitude signal is not greater than a predetermined value.

The foregoing objects are achieved by providing a plurality of transistor amplifier circuits. Each of the group of input signals from which the largest signal is to be identified is applied to a respective one of the base electrodes of the transistor amplifiers. The emitter electrode of each transistor amplifier is connected through a respective resistor to a common terminal to which is applied a voltage that is greater in magnitude than the largest expected input signal of the group. This applied voltage serves as a reverse bias to prevent any of the transistors of the amplifiers from conducting so long as it is applied to the common terminal. By eliminating the reverse bias at the predetermined moment, all transistor amplifiers are enabled, and the amplifier which receives the largest input singal will conduct and provide an output at the collector electrode thereof. When so conducting, this transistor functions to prevent any of the other transistors from conducting except possibly one to whose base is applied a signal greater than a predetermined percentage of the largest input signal. In this manner and under normal conditions, only one transistor amplifier provides an output signal, but if two or more input signals have their amplitudes insufficiently different, two or more transistor amplifiers will conduct, thereby indicating an error.

Other objects and advantages of the invention will become apparent from the following detailed description with reference to the single drawing, which is a circuit diagram of an embodiment of this invention.

The circuit shown in the drawing includes only four transistors for the sake of simplicity but it should be understood that any reasonable number may be provided; for example, the aforementioned patent application provides fourteen output signals representing the numerals 0 through 9 and four symbols for identifying the fields which contain the customer's account number, the dollar amount of a check and other fields containing information. Transistors 10, 11, 12 and 13 each have an emitter electrode, a base electrode, and a collector electrode. The respective base electrodes 15, 16, 17 and 18 are connected to input terminals 20, 21, 22 and 23 and these terminals receive signals S1 to S4 from apparatus which may be of a type described in said patent application. It is the largest of the signals so received which the circuit shown in the drawing must identify. Exemplary signals which might be applied to terminals 20–23 are illustrated immediately to the right of each such terminal.

A plurality of resistors 30, 31, 32 and 33 are connected between a potential source and the collector electrodes of respective transistors 10–13. In the embodiment illustrated, the transistors are of the NPN type and, therefore, resistors 30–33 connect the collector electrodes to a source of positive potential. In the quiescent condition of the circuit, no current is drawn through the resistors 30–33; therefore, the collector electrodes of all transistors are at the same voltage as the positive potential source. Under normal operating conditions, only one of transistors 10–13 conducts and it is that transistor to whose base electrode is applied the most positive input signal. The conducting transistor draws current from a positive source through its corresponding resistor 30–33, so that the collector electrode is negative with respect to the positive reference potential source, whereas the collector electrodes of all the non-conducting transistors remain at the +14 *v.* reference potential. To provide an identification of the greatest input signal, each collector electrode 35–38 is connected to a respective output terminal 40, 41, 42 or 43, and the one of these terminals which provides an output signal in the form of a negative pulse is used to identify the greatest input signal S1 to S4 while all the other terminals remain at a positive reference voltage.

The transistor functions so far described are primarily those of amplification, whereas the gating functions now to be described are those by which the identification process is achieved.

A plurality of resistors 45, 46, 47 and 48 are connected between the respective emitter electrodes 50, 51, 52 and 53 and a common lead 55 and this lead is connected to a common terminal 56. Also connected to this common terminal is the output lead 58 of a gating circuit 60. It is the function of the gating circuit to enable amplifiers 10–13 only at the predetermined moment when it is desired to identify the significant input signal and to disable the amplifiers at all other times. Gating circuit 60 comprises a transistor amplifier including a transistor 62 of the PNP type. The collector electrode 63 is connected to lead 58 and to a source of negative potential through a resistor 65. The emitter electrode 66 is connected to a source of positive potential, while the base electrode 67 is connected to an input terminal 69 and to a source of negative potential through a resistor 70.

In order to more clearly explain the operation of the complete circuit, specific values of potential have been indicated at the associated terminals. However, these values of potential are not to be considered limiting, but only illustrative.

In its steady state condition, transistor 62 receives no input signal at terminal 69 so that a forward emitter-base bias allows the transistor to conduct heavily. Collector electrode 63 is at substantially the potential of emitter electrode 66; namely, plus 6 *v.*, and is coupled through leads 58 and 55, and resistors 45–48 to the respective emitter electrodes of transistors 10–13. Each of emitter electrodes 50–53 therefore has a potential of +6 *v.* applied to it. Signals S1 to S4 never exceed +6 *v.*; therefore, a reverse bias from gating circuit 60 is established across the base and emitter electrodes of transistors 10–13, so that none of these transistors conduct and no signal identification is indicated at terminals 40–43 so long as gate 60 remains in the present condition.

At the predetermined moment when it is desired to sample the input signals to determine which has the largest amplitude, a short duration positive pulse is applied to input terminal 69 of gating circuit 60. This pulse is sufficiently positive to apply a reverse bias to the base and emitter of transistor 62, so that conduction ceases. Normally, the output lead 58 would drop to −14 v. when transistor 62 is cut off; however, since lead 58 is connected to lead 55 and transistors 10–13, the potential level of lead 58 is determined by the state of conduction of transistors 10–13. The net effect of the cutoff of transistor 62 is that it merely removes the positive bias voltage from leads 58 and 55 and the emitter electrodes of transistors 10–13 and allows them to conduct normally without suppression by the disabling bias voltage for the duration of the pulse applied to terminal 69.

For the purpose of the instant discussion as a foundation for a description of other novel features of the invention that will follow, it will be assumed for the moment that the resistance value of resistors 45–48 is zero. This would have the effect of connecting emitter electrodes 50–53 directly to common lead 55. The input signals S1 to S4 range in value from −5 v. to +6 v.; however, the most negative and most positive signals are not necessarily at these given voltages, but vary substantially within this range, depending upon the character of the symbol being read. The transistor to which is applied the most positive signal immediately conducts at a relatively high level of current. Assume further that signal S1 is of the most positive potential and is applied to the base electrode of transistor 10. In this case, the emitter electrode 50 would assume substantially the potential of the base electrode and, since the emitter electrodes of all transistors are connected together, they will all assume a potential substantially equal to the most positive input signal. Since all other signals S2 to S4 are less positive than signal S1, or negative with respect to the latter, all transistors except transistor 10 are reverse biased and will not conduct current. Consequently, only transistor 10 which, in this example, receives the most positive pulse will conduct and generate a negative output pulse at its terminal 40, whereas the output terminals of all the other transistors will remain at +14 v., for example. The greatest amplitude signal of a plurality of input signals is therefore identified by a negative signal at the output terminal corresponding to the input terminal which receives the greatest amplitude signal, while no output signals appear at any of the other output terminals or, stated more generally, a single output signal identifies a particular one of a plurality of different amplitude input signals.

It has been previously pointed out that the circuit of the present invention achieves two different results under different conditions; viz., it provides a single output signal when the ratio between the largest and the next-largest amplitude input signal is greater than a predetermined value to thereby identify a truly representative data element and distinguish it from all others, whereas it provides multiple outputs when said ratio is less than the predetermined value to thereby identify a falsely representative data element. These two results are accomplished by the circuit of this invention by providing resistors 45–48 having a finite value of resistance. The operation of the circuit will now be described, taking into consideration the presence in the circuit of impedances provided by resistors 45–48. The one of the transistors 10–13 which has the greatest input signal applied to it starts conducting when the circuit is enabled by gating circuit 60. However, a substantial voltage drop is now provided across the corresponding resistor 45–48 and the voltage at common lead 55 is substantially less than that of the largest input signal; therefore, the voltage coupled by lead 55 to the other emitter electrodes is less than the largest input signal or negative with respect to the latter, but the voltage of lead 55 may or may not be less than the next-largest input signal depending upon whether the original data element is a true or false representation of the intelligence being recognized. So long as the greatest input signal exceeds the next-largest input signal by a predetermined percentage, or ratio, the largest input signal is identified by a corresponding signal at an output terminal of the circuit. However, if the ratio between the two largest input signals is less than this predetermined value, the circuit indicates that the input signals are false or that an error is present in the information borne by the input signals, in which case signals would be generated at two or more of the output terminals of the circuit.

Specific numerical quantities will now be provided to illustrate how this circuit will deliver either a single output signal or two or more output signals in accordance with the relative levels of the input signals. For purposes of this example, specific values of resistance are assigned to the various significant resistors. Resistors 45–48 are each equal to 300 ohms and resistor 65 is equal to 8200 ohms. It will be assumed that the largest input signal S1 to S4 has a value of +4 v. The transistor to whose base is applied this signal will cause common lead 55 to assume a voltage of approximately +3.3 v., taking into consideration a 30 ohms base to emitter resistance of this transistor. It was stated earlier that the maximum potential range of input signals S1 to S4 is between a reference level of −5 v. and a maximum of +6 v. Since the largest input signal received, according to the present example, is +4 v. and the reference level is −5 v., the actual magnitude of the largest input voltage becomes 9 v. The potential of lead 55 with respect to the −5 v. reference level is 8.3 v. and is equal to 92% of the potential of the largest input signal. If all other input signals are less than 92% of the potential of the largest input signal, only a single output signal would be provided by the circuit and that output signal would correspond to the largest input signal. On the other hand, if any input signal is greater than 92% of the largest input signal, a multiple output will be provided by the circuit, thereby indicating an error.

A novel circuit has been described, whereby the largest of a plurality of input signals is identified and this identification may be timed to occur at a predetermined moment. A false data element is also detected and the false representation or error is indicated by multiple output signals which are generated if the ratio between the two largest input signals is less than a predetermined value. Although particular types of transistors and particular values of voltages and resistors have been illustrated, these are not to be considered in any way as limitations upon the invention. For example, all transistors shown could be of the opposite type of polarity; viz., each NPN or PNP transistor could be substituted for the other, and all potentials could be of reversed polarity and still the circuit would remain within the scope of this invention. Such a modified circuit would identify the most negative rather than the most positive input signal. By increasing the value of resistors 45–48, multiple output signals would result from a greater range of differences between the two largest input signals. Conversely, by decreasing the value of these resistors, a narrower range would produce multiple outputs and error indication.

While the principles of the invention have now been made clear in the illustrative embodiment, there will be immediately obvious to those skilled in the art many other modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications within the limits only of the true spirit and scope of the invention.

What is claimed is:

1. A circuit for identifying the one of a plurality of input signals which has the maximum voltage, comprising; a plurality of transistors, each having an emitter, a collector and a base electrode, means for applying each of said input signals to a different one of said base electrodes, a common terminal, a plurality of substantially equal resistors, each of said resistors being connected between said common terminal and a respective one of said emitter electrodes and an additional resistor, said additional resistor being connected to said common terminal for providing a path for current flow through any one of said emitter electrodes.

2. A circuit for identifying the one of a plurality of input signals which has an extreme value, comprising; a plurality of transistors each having an input electrode, an output electrode and a control electrode, means for applying each of said input signals to a different one of said input electrodes, a common terminal, a plurality of substantially equal impedance means, each of said impedance means being connected between said common terminal and a respective one of said control electrodes, a common impedance connected to said common terminal for providing a path for current flow through any one of said control electrodes, and a plurality of separate output terminals, each of said output terminals being coupled to the output electrode of a respective one of said transistors, whereby the one of said transistors which receives the input signal having said extreme value provides an output signal at the corresponding output terminal.

3. A circuit for identifying the one of a plurality of input signals which has the greatest voltage amplitude relative to the voltage amplitudes of all the other signals, comprising; at least three transistors, each having an emitter, a collector and a base electrode, means for applying each of said input signals to a different one of said base electrodes, a common terminal, a plurality of substantially equal resistors, each of said resistors being connected between said common terminal and a respective one of said emitter electrodes an additional resistor, said additional resistor being connected to said common terminal for providing a path for current flow through any one of said emitter electrodes, and a plurality of separate output terminals, each of said output terminals being coupled to the collector electrode of a respective one of said transistors, whereby the one of said transistors which receives the input signal having said greatest voltage amplitude provides an output signal at the corresponding output terminal.

4. The apparatus of claim 3 further including a plurality of impedance means, each of said impedance means being connected to a respective one of said collector electrodes.

5. A circuit for identifying the one of a plurality of input signals which has an extreme value, comprising; at least three amplifying means, each having an input terminal, an output terminal, and a control connection, means for applying each of said input signals to a different one of said input terminals, a common terminal, a plurality of impedances, each of said impedances being connected between said common terminal and a respective one of said control connections and a common impedance connected to said common terminal for providing a path for current flow through any one of said control connections.

6. A circuit for identifying the one of a plurality of input signals which has an extreme value, comprising; at least three transistors, each having an emitter, a collector, and a base electrode, means for applying each of said input signals to a different one of said base electrodes, a common terminal, a plurality of resistors, each of said resistors being connected between said common terminal and a respective one of said emitter electrodes, and an additional resistor, said additional resistor being connected to said common terminal for providing a path for current flow through any one of said emitter electrodes.

7. A circuit for identifying the one of a plurality of input signals which has an extreme value, comprising; at least three transistors, each having an input electrode, an output electrode, and a control electrode, means for applying each of said input signals to a different one of said input electrodes, a common terminal, a plurality of impedances, each of said impedances being connected between said common terminal and a respective one of said control electrodes a common impedance connected to said common terminal for providing a path for current flow through any one of said control electrodes, and a plurality of separate output terminals, each of said output terminals being coupled to a respective one of said transistors whereby the one of said transistors which receives the input signal having said extreme value provides an output signal at the corresponding output terminal.

8. A circuit for identifying the one of a plurality of input signals which has an extreme value, comprising: at least three transistors, each having an emitter, collector and a base electrode; means for applying each of said input signals to a different one of said base electrodes; a common terminal; a plurality of resistors, each of said resistors being connected between said common terminal and a respective one of said emitter electrodes; gating means coupled to said common terminal for applying thereto a gating voltage for preventing current flow in all of said transistors; and enabling means coupled to said gating means for eliminating said gating voltage during a predetermined time interval; whereby during said predetermined time interval a signal is delivered at the collector electrode of the transistor which receives the input signal having said extreme value.

References Cited in the file of this patent

UNITED STATES PATENTS

| | | |
|---|---|---|
| 2,504,884 | Schock | Apr. 18, 1950 |
| 2,505,074 | Trevor | Apr. 25, 1950 |
| 2,775,693 | Berwin | Dec. 25, 1956 |
| 2,831,127 | Braicks | Apr. 15, 1958 |
| 2,870,348 | Chao | Jan. 20, 1959 |
| 2,880,331 | MacSorley | Mar. 31, 1959 |
| 2,979,625 | Bothwell | Apr. 11, 1961 |

FOREIGN PATENTS

| | | |
|---|---|---|
| 577,801 | Great Britain | May 31, 1946 |